(12) United States Patent  
Sadler

(10) Patent No.: US 8,473,516 B2  
(45) Date of Patent: Jun. 25, 2013

(54) COMPUTER STORAGE APPARATUS FOR MULTI-TIERED DATA SECURITY

(75) Inventor: Lloyd W. Sadler, Allentown, PA (US)

(73) Assignee: LSI Corporation, Allentown, PA (US)

( * ) Notice: Subject to any disclaimer, the term of this patent is extended or adjusted under 35 U.S.C. 154(b) by 294 days.

(21) Appl. No.: 12/411,391

(22) Filed: Mar. 25, 2009

(65) Prior Publication Data

US 2010/0250602 A1 Sep. 30, 2010

(51) Int. Cl.
*G06F 17/30* (2006.01)

(52) U.S. Cl.
USPC .......................... 707/783; 380/44

(58) Field of Classification Search
USPC .......................... 707/783; 380/44
See application file for complete search history.

(56) References Cited

U.S. PATENT DOCUMENTS

| | | | |
|---|---|---|---|
| 5,297,207 A * | 3/1994 | Degele | 380/46 |
| 5,453,877 A | 9/1995 | Gerbe et al. | |
| 5,799,090 A * | 8/1998 | Angert | 380/43 |
| 5,826,016 A | 10/1998 | Ito et al. | |
| 6,003,133 A | 12/1999 | Moughanni et al. | |
| 6,094,483 A | 7/2000 | Fridrich et al. | |
| 6,215,689 B1 | 4/2001 | Chhor et al. | |
| 6,324,287 B1 * | 11/2001 | Angert | 380/43 |
| 6,684,335 B1 | 1/2004 | Epstein, III et al. | |
| 6,802,000 B1 | 10/2004 | Greene et al. | |
| 6,944,581 B2 | 9/2005 | Creek | |
| 7,035,700 B2 | 4/2006 | Gopalan et al. | |
| 7,436,568 B1 | 10/2008 | Kuykendall, Jr. | |
| 7,532,027 B2 | 5/2009 | Lazaravich et al. | |
| 7,627,218 B2 | 12/2009 | Hurley | |
| 7,644,860 B2 | 1/2010 | Matsushita et al. | |
| 7,861,094 B2 | 12/2010 | Klein | |
| 8,068,612 B2 | 11/2011 | Appenzeller et al. | |
| 8,161,527 B2 | 4/2012 | Curren | |
| 8,244,211 B2 | 8/2012 | Clark | |
| 2002/0186131 A1 | 12/2002 | Fettis | |
| 2002/0191786 A1 * | 12/2002 | Marroquin | 380/42 |
| 2005/0273845 A1 | 12/2005 | Urano et al. | |
| 2006/0080545 A1 | 4/2006 | Bagley | |
| 2007/0074276 A1 | 3/2007 | Harrison et al. | |
| 2008/0031456 A1 | 2/2008 | Harrison et al. | |
| 2008/0072058 A1 | 3/2008 | Cedar et al. | |
| 2008/0140572 A1 | 6/2008 | Jackson | |
| 2008/0208758 A1 | 8/2008 | Spiker et al. | |
| 2009/0109056 A1 | 4/2009 | Tamarkin et al. | |
| 2009/0189974 A1 | 7/2009 | Deering | |
| 2009/0241182 A1 | 9/2009 | Jaber et al. | |
| 2010/0091995 A1 | 4/2010 | Chen et al. | |
| 2010/0149073 A1 | 6/2010 | Chaum et al. | |
| 2011/0101093 A1 | 5/2011 | Ehrensvaerd | |

OTHER PUBLICATIONS

Ristanovic et al., The Book Cipher Algorithm, 2008, drdobbs.com.*
Wikipedia, Offset (computer science), Feb. 22, 2009, Accessed Jan. 13, 2012.*

(Continued)

*Primary Examiner* — William Spieler

(57) ABSTRACT

A computer storage apparatus. In one embodiment, the apparatus includes: (1) primary file storage, (2) a controller coupled to said primary file storage and configured to provide an interface by which data is communicated therewith, (3) formula/offset file storage coupled to said controller and configured to store at least one formula/offset and (4) pointer file storage coupled to said controller and configured to store at least one pointer, said controller further configured to provide said interface based on interaction with said formula/offset file storage and said pointer file storage.

12 Claims, 1 Drawing Sheet

OTHER PUBLICATIONS

Drajic, An Elementary Introduction to Cryptography, South Eastern Europe Conference on Regional Security through Data Protection, Dec. 1, 2003.*

Wikipedia, Running key cipher, Jun. 2, 2008.*

Sadler; "System for Data Security Using User Selectable One-Time Pad"; U.S. Appl. No. 12/411,362, filed Mar. 25, 2009.

Sadler; "Device for Data Security Using User Selectable One-Time Pad"; U.S. Appl. No. 12/411,375, filed Mar. 25, 2009.

Sadler; "Systems and Methods for Information Security Using One-Time Pad"; U.S. Appl. No. 12/411,389, filed Mar. 25, 2009.

Anckaert, B., et al., "Practical Data Location Obfuscation," Microsoft Research, Jan. 2009, Technical Report, MSR-TR-2009-3, 15 pages.

Anderson, R. J., et al., "On the Limits of Steganography," IEEE Journal on Selected Areas in Communications, vol. 16, No. 4, May 1998, pp. 474-481.

Beale, J., "Security Through Obscurity Ain't What they Think It Is," Bastille Linux Project, 2000, Accessed Sep. 9, 2012, Online: http:portknocking.org/docs/security-through-obscurity-beale.pdf, 4 pages.

Duraiswamy, K., "Security Through Obscurity," May 30, 2005, Accessed Sep. 4, 2012, Online: http://www.rootsecure.net/content/downloads/pdf/security_through_obscurity.pdf, 7 pages.

Haller, N., et al., "A One-Time Password System," Standards Track, Network Working Group, RFC 2289, Feb. 1998, 25 pages.

Lyon, P.C., "Choosing the Right Display System for a Flight Training Simulator," Evans & Sutherland Computer Corporation, Estimated Publication Date 1993, pp. 221-226.

Rockwell Collins, "HUD Basics," Published about 2008 on the Internet, Accessed online May 4, 2009, 3 pages.

Simmons, G. J., "The Prisoners' Problem and The Subliminal Channel," In Proceedings of CRYPTO'83, 1984, pp. 51-67.

Wagner, N. R., "The Laws of Cryptography: Perfect Cryptography: The One-Time Pad," 2002, http://www.cs.utsa.edu/~wagner/laws/pad.html, 4 pages.

Wong, R. M., et al., "Polonius: An Identity Authentication System," IEEE Symposium on Security and Privacy, 1985, pp. 101-107.

* cited by examiner

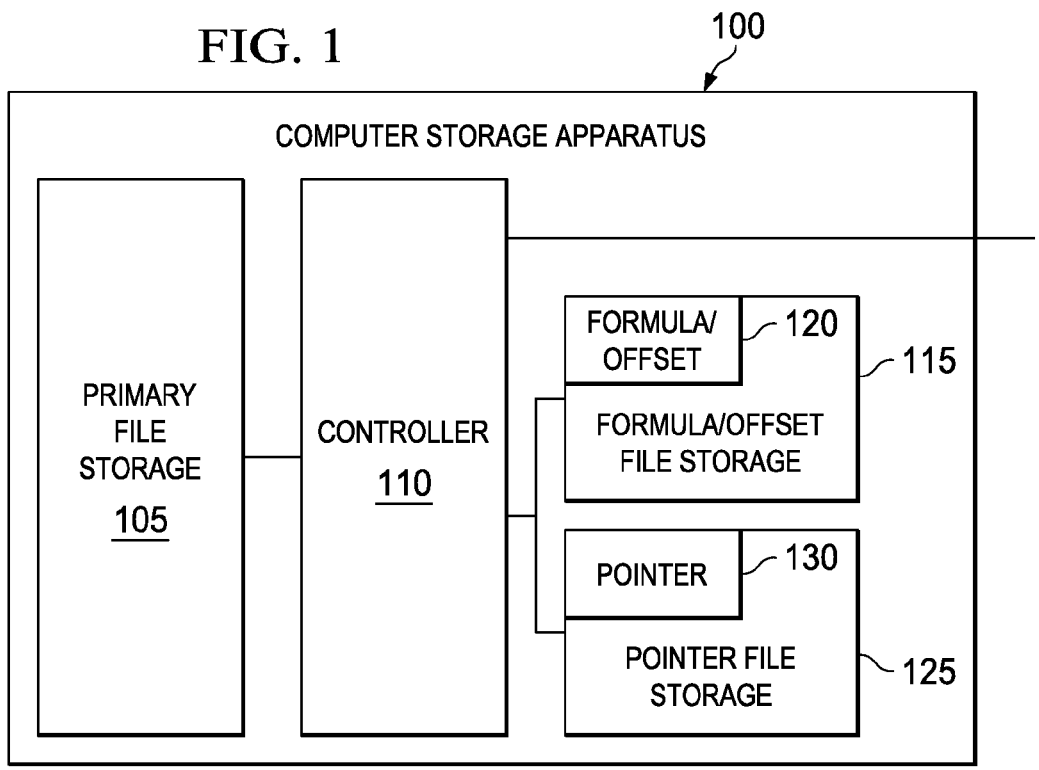
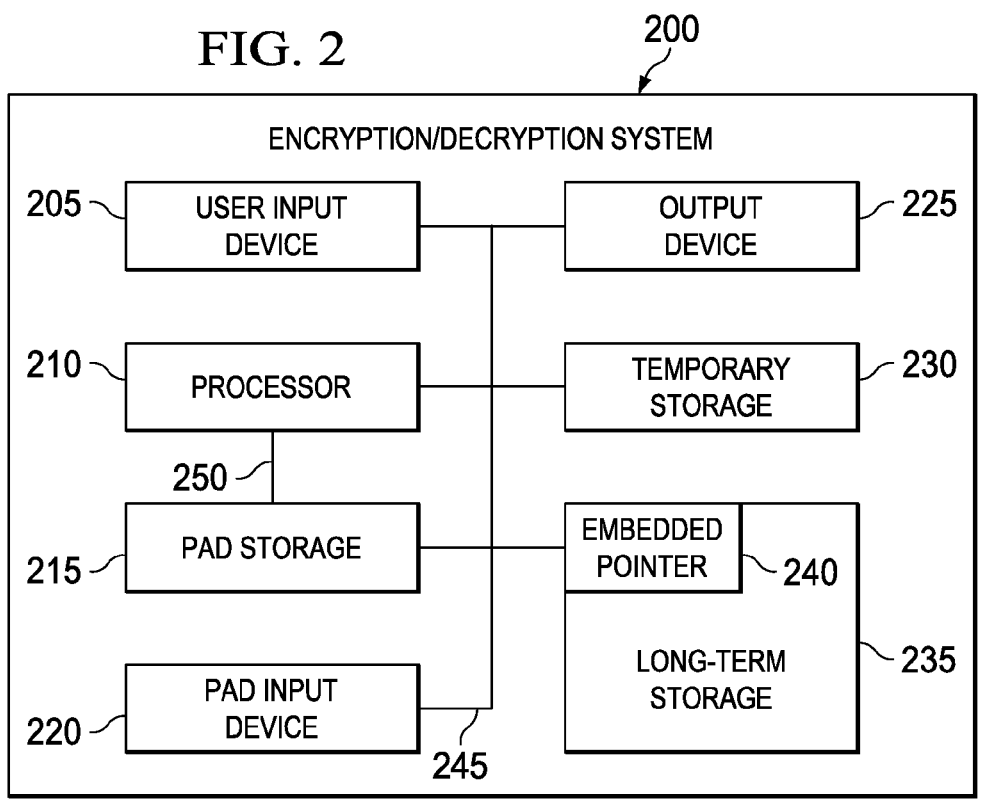

COMPUTER STORAGE APPARATUS FOR MULTI-TIERED DATA SECURITY

CROSS-REFERENCE TO RELATED APPLICATIONS

This application is related to the following U.S. patent applications, which are commonly assigned herewith and incorporated herein by reference:

Ser. No. 12/411,362, filed by Sadler on even date herewith and entitled "System for Data Security Using User Selectable One-Time Pad;"

Ser. No. 12/411,375, filed by Sadler on even date herewith and entitled "Device for Data Security Using User Selectable One-Time Pad;"

Ser. No. 12/411,389, filed by Sadler on even date herewith and entitled "Systems And Methods for Information Security Using One-Time Pad."

TECHNICAL FIELD

This application is directed, in general, to cryptographic systems and methods and, more specifically, to a system for data security using a user selectable one-time pad.

BACKGROUND

Data security has been a concern in data storage for many decades. Presently, two approaches are derived to secure stored data.

The most conventional approach to secure stored data is to use a password. Unfortunately, passwords suffer two major shortcomings. First, they are not particularly difficult for a unauthorized person to discover, for example, by the user's having written it down, by knowing information about the user that can lead to an educated guess, by brute-force trial-and-error experimentation, or by exploiting a password resetting mechanism. Second, even without the password, an unauthorized person can exploit architectural weaknesses in the system in which the data is stored to bypass the password and gain direct access to the data.

The second approach to secure stored data is to encrypt the data using an encryption key. Although encryption generally lacks the above-described disadvantages of passwords, encoding of the stored data has several of its own problems. First, encryption typically introduces into substantial inefficiencies into the data and its storage, because encryption often requires additional storage for the encrypted data and/or additional processing to gain access to and subsequently store the data. Second, encryption typically uses one of a small number of mathematical techniques to encrypt the data. The techniques can consume significant processing resources. Third, virtually all encryption techniques fall short of being "perfect" in that the encrypted data contains embedded information which, given sufficient time and processing resources, can be used to break the encryption. Accordingly, once the mathematical encryption technique is identified or sufficient quantities of encrypted data are acquired, it is often possible to decrypt the data. As processing power, including the processing power demonstrated by vast networks of otherwise independent computers, increases the amount of time and effort required to break an imperfect encryption code decreases. While encrypting with random number sequences can address some of these problems, few absolute random number encryption approaches are readily available in the context of deterministic digital computer systems.

SUMMARY

One aspect provides a computer storage apparatus. In one embodiment, the apparatus includes: (1) primary file storage, (2) a controller coupled to said primary file storage and configured to provide an interface by which data is communicated therewith, (3) formula/offset file storage coupled to said controller and configured to store at least one formula/offset and (4) pointer file storage coupled to said controller and configured to store at least one pointer, said controller further configured to provide said interface based on interaction with said formula/offset file storage and said pointer file storage.

In another embodiment, the apparatus includes: (1) non-volatile primary file storage selected from the group consisting of: (1a) at least one hard disk drive and (1b) a flash drive and configured to contain data including a common document serving as a onetime pad, (2) a controller coupled to said primary file storage and configured to provide an interface by which data is communicated therewith and security for said data, (3) formula/offset file storage coupled to said controller and configured to store at least one formula/offset and (4) pointer file storage coupled to said controller and configured to store at least one pointer, said controller further configured to provide said interface based on interaction with said primary file storage, said formula/offset file storage and said pointer file storage.

BRIEF DESCRIPTION

Reference is now made to the following descriptions taken in conjunction with the accompanying drawings, in which:

FIG. 1 is a block diagram of one embodiment of a computer storage apparatus; and FIG. 2 is a block diagram of one embodiment of an encryption/decryption system.

DETAILED DESCRIPTION

Described herein are various embodiments of a computer storage apparatus. The apparatus makes use of a user selectable one-time pad and a generated pointer employed to derive a key from it. The key can be then used either as a passcode for access to secured data or, in an alternative embodiment, as a data encryption key to decrypt the secured data.

Various of the embodiments are substantially superior to the conventional one-time pad approach for data communication or storage. Specific embodiments address the deficiencies described below with respect to one-time pad encryption, which have plagued their real-world application. Certain of the embodiments described herein make use of a multi-tiered security approach, allowing password recovery without requiring a "system" password or a third-party with the ability to grant access to the data or change the user's password.

Since the concept of a one-time pad is important to an understanding of the teachings herein, a brief introduction into the one-time pad will now be undertaken. A one-time pad, also sometimes called a Vernam cipher, is often referred to as the one "perfect" encryption method. It is considered "perfect" because it is provably mathematically impossible to cryptanalyze one-time pad encoded information. In the context of cryptography, the term "perfect" means that an unauthorized person has no more information about the plaintext after he receives the ciphertext than before he received it. The one-time pad is known as the simplest "perfect" encryption technique. Without knowledge and information outside that contained in the ciphertext, the one-time pad technique has been demonstrated to be completely unbreakable.

In most common uses, the one-time pad is a variation on the Beale cipher. During typical use, the one-time pad approach combines the plaintext of a message with a random key selected from the one-time pad. For example, starting with a random series of letters for standard text, from the one-time pad as the key, then combining this series of letters with the message text creates the encrypted message. According to Shannon, "Communication Theory of Secrecy Systems," four rules must be followed in order to make an encryption using a one-time pad communication unbreakable. These rules are as follows:

1. The key, derived from the one-time pad, must be at least as long as the plaintext message being encrypted.

2. The key must be mathematically random, in other words, such a key cannot be generated by a deterministic computer algorithm.

3. Only two copies of the key should exist: one for the sender and one for the receiver (some exceptions exist for multiple receivers).

4. The key is only used once. Both the sender and the receiver should destroy their copies of the key after its use.

These rules are modified in some embodiments described herein. Therefore, the system disclosed hereby may be regarded as a derivation of the one-time pad approach. In various of those embodiments:

1. The one-time pad is longer, and likely much longer, than the key derived from it. The key is derived from the one-time pad beginning at a pointer location and continuing as long as necessary.

2. The key achieves its "randomness" through use of a modified pointer that points to a location within a user-selected text known only to the user.

3. While multiple copies of the key and the one-time pad are available, only the user and the protected system have information identifying the specific user-selected text as the one-time pad. As long as knowledge that the user-selected text is being used as a pad for the selection of a key is confined to the user, the text operates as a random one-time pad.

4. The key, derived from the one-time pad, is only used once for encryption since it is identified from a modified pointer, which is used only once.

One-time pads have been used as a means of encrypting messages for some time. However, because conventional one-time pads are long lists of random characters (as noted above, the list of random characters must be at least as long as the message itself) the one-time pads, which the user must possess to code and decode messages as the key to the coded data, are easily identified as one-time pads by knowledgeable observers. ("Random," as that term is used herein, means at least pseudorandom, and therefore not necessarily mathematically random.) Moreover, because one-time pads are primarily used to communicate between two or more individuals, multiple identical copies of the one-time pads are often necessary. Accordingly, the use of one-time pads as an encryption technique has been limited by these requirements for multiple copies of long lists of random characters. When long lists of random characters are generated, their appearance betrays their use as an encryption key. Further, when multiple copies of such a long lists of random characters are made, an opportunity exists to create additional unauthorized copies of the one-time pad, such unauthorized copies can then be used to attack the encrypted data directly.

Various of the embodiments address these limitations by substituting for the long list of random characters (which conventionally made up the one-time pad) a user-selected document, the use of which as a one-time pad the user maintains as a secret. Because the user-selected, common document substantially lacks random lists of characters and has substantial standalone linguistic use (i.e., employs a written language to communicate) independent of any role it may have in encryption, the user-selected document is defined as a "common document." This user-selected, common document is used with a combination of a pseudorandom pointer, selected by the computational system, and a user-selected formula, which is applied to the pointer to identify the starting point of the key in the one-time pad. The "key," extracted from the one-time pad, is used as a one-time password and/or as an encryption key for the encryption of a stored file or data in the computational system. Of course, the same key would be expected to be used for subsequent decryption, since the encryption is symmetric.

Accordingly, in various of the embodiments, the one-time pad is based on a user-selected, common document rather than a list of random characters. The one-time pad, thus derived, is effectively random because (1) only the user is aware of the common document, and (2) by using a user-selected algorithm or formula which is applied to a computationally generated pseudorandom pointer for selecting characters, typically the starting point of the key, from the common document (or one-time pad), a series of characters with the attributes of a random series can be effectively generated. Moreover, a common document used as a one-time pad is actually more secure than a random series of characters, since, as noted above, a user heretofore had to possess a one-time pad containing the random series of characters used as a key. This common document, if discovered, is readily identifiable as a series of random characters, belying its likely use in encryption. In contrast, a common document, such as a book, would be known only to the user, and its existence or discovery would not appear out of place as a one-time pad by anyone who discovers it, especially when located among a collection of books or like common documents. Moreover, a user heretofore had to retain a one-time pad containing a series of random characters, because if it is lost, the ability to decrypt the data from the secure communication channel is also lost. In contrast, certain of the embodiments allow the use of a common document as a one-time pad that need only be available, not retained.

As an example, suppose a user selects as a one-time pad the 2004 edition of the Oxford American Writer's Thesaurus. This edition of the Thesaurus is demonstrably readily available in libraries, book stores and online. Were the user to lose or misplace his or her own copy of this one-time pad, a replacement copy could be readily obtained without attracting suspicion or giving away its use as a one-time pad. The three principle drawbacks of the use of one-time pad security are thus addressed.

1. Conventional one-time pads require mathematically random one-time pads, which are not only somewhat difficult and costly to generate, they are essentially impossible to recover if lost and, if detected, are easily identifiable as one-time pads. Since the randomness in certain embodiments of this disclosure is addressed through a user-only known algorithm applied to a random pointer to a particular specific location in a user-only known common document, effective apparent randomness is accomplished in a manner that is appropriate to use in a deterministic computer system.

2. The one-time pad must be at least as long as the message. Since this disclosure uses a common document, typically a long common document such as a booklength manuscript, as the source material for the pre-processed pad, in order to produce a short message or password, certain embodiments described herein virtually assure that the one-time pad will always be capable of being substantially longer than the message. As described herein, the common document that forms the one-time pad is stored in the secured system, after being selected and entered by the user. The storage is typically carried out in a compressed or uncompressed form within a one-time programmable electronic memory device. In one embodiment, the one-time programmable memory device is adapted to ensure that the data stored is not accessible if the device is removed, examined or accessed by an unauthorized person.

3. To preserve security, the one-time pad should be maintained as a secret from all unauthorized persons, and a particular pad sequence should be used only once. This disclosure addresses the secrecy issue through the use of a user selectable common document as a pad. The common document draws no attention to itself. In other words, an unauthorized person is faced with the problem of attempting to find the correct common document without having any information as to the characteristics that distinguish the correct common document from all others.

Moreover, as introduced above, certain embodiments call for the start pointer to be generated during setup (for the first use) or subsequently during a previous communication. In one embodiment, the start pointer points directly to the first character of the key within the one-time pad, while in other embodiments, the first character of the key is identified by an offset applied to the start pointer. In still other embodiments, the user is provided with the capability of selecting an algorithm for identifying the key from the start pointer. This use of a previously generated pointer means that an unauthorized user would have to have access to both the one-time pad (the user-selected, common document) and the pointer generated during the user's previous authorized use of the system to compromise the encryption. Moreover, because an additional tier of security may be provided by transforming the pointer with a user-selected formula, the unauthorized user would also need to know this formula in order to determine where in the one-time pad to look for the start of the key. A multi-tiered approach to security may therefore result, made up of: (1) a secret pad, (2) a secret formula applied to a pointer, and (3) a secret pointer, which after application of the secret formula, points to the key, either directly or with an offset, within the secret pad. Each of these secrets would need to be compromised for an unauthorized user to gain access to the encrypted data. In one embodiment, the starting point or "pointer" (e.g., page, line and word, or chapter, paragraph and character) to be used during the next communication is pseudorandomly generated by the system and confirmed that it has never been previously used before being communicated to the user. In an alternative embodiment, the user selects the pointer and communicates it to the system.

In various embodiments, the "pointer" is stored in the system by embedding it within data in a file. Multiple pointers, perhaps with links among the pointers and their associated data or files, may be maintained in various embodiments. In one specific embodiment, a steganographic technique is employed in which one or more pointers are converted to binary form and embedded in one or more image or sound files. If detected, they would appear to be noise or encoding errors and difficult to discern as important.

In one embodiment, the pointer is provided to the user in a form that appears to be a telephone number (i.e., xxx-yyy-zzzz), so that the user can write it down if necessary without giving away its purpose. As above, the pointer may relate to a page, line and word, or alternatively to a chapter, paragraph and character, for the beginning of the key, or some other combination that can uniquely identify a starting character in a common document that serves as a one-time pad. Accordingly, other pointer references are possible and likely without departing from the scope of the invention.

Continuing the example that employs the 2004 Oxford Thesaurus as a one-time pad, a typical pointer may be represented as "610-712-2158," interpreted as a pointer to page 610, line 12, word 8, namely the word "Kafkaesque" as the start of the key for the current code or as the password for the current session on the system. In another embodiment, the user defines a formula at setup, which is applied to modify the pointer to point to the start of the one-time pad for the current use. In a related embodiment, an offset can be applied to the modified formula to obscure the key further. For example, the following formula to the pointer may be selected:

Page #=truncate[0] (xxx/7),

Line #=two least significant digits of yyy+11, and

Word #=zzzz-1957->middle two digits summed together.
This formula (which is typically selected by, and therefore typically known only to, the user) leads to the following start pointer or password pointer to the one-time pad for the pointer representation "610-712-2158", viz.:

Page #=610/7=87.14; truncate[0] 87.14=87; therefore Page 87,

Line #=two least significant digits of (712+11 723) or 23, and

Word #=2158−1957=0201 middle two digits being 2 and 0, summed together=2.

Therefore, the pointer to the beginning of the key or to a session password, derived from the previously generated pointer of "610-712-2158" and used in the one-time pad would be Page #87, Line #23, Word #2, pointing to the word "Talk."

In the illustrated embodiment, since (1) only the user knows the common document of the "one-time pad" (in this example the 2004 Oxford American Writer's Thesaurus), (2) only the user knows the user-selected applied formula (in this example: Page #=truncate[0] (xxx/7); Line #=two least significant digits of yyy+11; Word #=zzzz-1957-> use least middle two digits summed together) and (3) a new pointer is generated for each use from the previously session (in this example "610-712-2158"), the one-time pad starting point, defining the key within the one-time pad, is secure.

In various embodiments, the following four features, among others, may be regarded as novel and nonobvious, either alone or in combination:

1. Use of a user-selected, common document as a one-time pad. In the illustrated embodiment, the user-selected, common document is a published long-form written common document, which is scanned into the system for storage in an uncompressed or compressed form in the one-time programmable protected circuit.

2. Use of a pseudorandom series selected from the one-time pad as the password and/or encryption key. In the illustrated embodiment, the pointer to the beginning of the one-time key is generated in a pseudorandom fashion automatically by the system for each use during the (or alternatively "a") previous use and, after it is checked to ensure that it has not been previously used, is communicated to the user.

3. Use of a one-time programmable protected circuit for the storage of the one-time pad.

4. Use of a storage device to store the pointer within a common document in a manner that is not readily apparent, e.g., embedded within a digital photograph or a music file.

For example, the user's password according to the above formula-applied pointer may be the word "Talk." After the user successfully enters a password, "Talk," a new, pseudorandom pointer, for example, "719-533-7969," may be generated and displayed as an image on a computer display device to the user. Applying the user's predefined formula yields a new password, page 102, line 44, word 15, or the word "Sort." Uses to encrypt a message, data or file may be accomplished in essentially the same manner, automatically and without user intervention once the correct key is entered by the user, by applying the pointer to the "one-time pad" to generate the encryption key. For example, using a pointer of "703-308-4357" and the above formula would lead to an encryption key from the one-time pad of "slivovitz brash adjective a brash man self-assertive, pushy, cocksure, cocky, self-confident, arrogant, bold, audacious, brazen, bumptious, overweening, puffed-up, forward, impudent, insolent, rude . . . ." This key is then stripped of repetitive words and non-alphabetic characters, yielding the following string:

"slivovitzbrashadjectiveamanselfassertivepushycocksure cockyselfconfidentarrogant-boldaudaciousbrazenbumptious overweeningpuffedup-forwardimpudentinsolentrude . . . "

This string may then be automatically applied (ciphered) to the message to produce an encrypted message, for example for the message "THIS IS A TEST MESSAGE," using a simple numeric substitution (0 for <space>; 1 for A; 2 for B, etc., with punctuation marks assigned values that follow 26), summation with scale of 0 to 50. It should be noted that the relatively simple numeric substitution described above as an example combination technique of summation shown below can be substituted with any other one-to-one mathematical technique, such as subtraction, multiplication, division and/or shifting without carry) and re-substitution cipher. It should also be noted that the manner in which the key is applied to the clear text message is referred to as the cipher. In this example the cipher is simple summation after conversion from an alpha-symbol-numeric character to a numeric representation of such), would be converted to:

$T(20)+s(19)=((39)$ $H(8)+I(12)=T(2O)$ $I(9)+i(9)=R(18)$ $S(19)+v(22)=-(41)$ $<sp>(0)+o(15)=O(15)$ $I(9)+v(22)=!(31)$ $S(19)+i(9)=,(28)$ $<sp>(0)+t(20)=T(20)$ $A(1)+z(26)=(27)$ $<sp>(0)+b(2)=B(2)$ $E(5)+a(1)=F(6)$ $S(19)+8(19)=*(38)$ $T(20)+h(8)=,(28)$ $<sp>(0)+a(1)=A(1)$ $M(13)+d(4)=Q(17)$ $E(5)+j(10)=O(15)$ $S(19)+e(5)=X(24)$ $S(19)+c(3)=V(22)$ $A(1)+t(20)=U(21)$ $G(7)+i(9)=P(16)$ $E(5)+v(22)=.(27)$

Thereby converting the message "THIS IS A TEST MESSAGE" to "(TR-O!,T.BT*, AQOXVUP".

Without access to the pointer, the offset applied to the pointer, the formula applied to the pointer, the one-time pad, and the cipher applying the pointer to passage in the one-time pad to the message, it should be effectively impossible to decode the encoded message. Because the pointer is likely to be changed with each use, the offset and the formula are likely to be set by the user, the one-time pad is chosen by the user, and the cipher is either set by the user, or in cases where there is no need to communicate the cipher, generated by a pseudorandom process by the system, near-perfect security is attained with relatively low user inconvenience and while maintaining the ability of the user to access one or more messages, data or files without having to leave a master password with another person.

Naturally, more sophisticated substitution and/or shifting ciphers, typically including decoy padding characters to change the apparent length of the encoded message, can, and typically would, be employed in certain embodiments, this example is selected for its simplicity and for its understandability. The reverse of this can, of course, be employed for decryption since the encryption described herein is symmetric.

Various embodiments of a system suitable for carrying out various of the embodiments described above will now be described. FIG. 1 is a block diagram of one embodiment of a computer storage apparatus 100. In various embodiments, the apparatus 100 takes the form of an integrated circuit (IC), a "chipset" of multiple ICs, an assembly of circuits and other hardware components, a mixture of hardware and software components and other forms suitable for a particular application. The apparatus 100 may be used in a wide variety of electronic devices including, without limitation: desktop, laptop and notebook computers, personal digital assistants, cellphones, media (e.g., MP3 or video) players and set-top boxes.

The apparatus 100 includes or is coupled to primary file storage 105. The primary file storage 105 provides nonvolatile memory for storage of data, typically arranged into one or more files. In various embodiments, the primary file storage 105 includes a hard disk drive, static random access memory (SRAM), a flash drive or a combination of these. The data may be computer data, audio, video or other streaming data or any data desired to be secured.

The apparatus 100 includes a controller 110. The controller 110 is configured to provide an interface between the primary file storage 105 and external devices (not shown). For example, the controller 110 may buffer data and map data addresses from an external format to locations within the primary storage 105. Those skilled in the pertinent art are familiar with the various conventional functions a controller 110 may perform.

In addition to the conventional functions, the controller 110 is configured to provide security for the data stored in the primary file storage 105 in accordance with the principles of the invention. More specifically, various embodiments of the controller 110 are configured to evaluate the authenticity of passwords, employ pointers, formulas and offsets to generate keys from one-time pads and employ those one-time pads to encrypt and decrypt data and provide subsequent passwords to a user.

In those embodiments in which the controller generates keys from a one-time pad, a file, typically an image or sound file is stored in formula/offset file storage 115. The file has embedded within it either one or more formulas, one or more offsets or both formulas and offsets 120. These are applied to pointers 130, which are stored in and extracted from pointer file storage 125. In one embodiment, the pointers and any associated file reference information is stored in binary form.

In one embodiment, the controller 110 is configured to receive a password (typically supplied by a user, but alternatively supplied by an external source other than a user). The controller 110 is then configured to employ the one-time pad, a pointer, and either or both of a formula and an offset to verify the password. If the password is valid, the controller 110 grants read or write access to a corresponding file or the primary file storage 105 as a whole.

In another embodiment, the controller 110 is configured to receive a pointer (again typically supplied by a user, but alternatively supplied by an external source other than a user). The controller 110 is then configured to employ the pointer, and either or both of a formula and an offset to generate an encryption or decryption key from a one-time pad. That key may then be employed to encrypt a file to be written to the primary file storage 105 or decrypt a file read from the primary file storage 105.

FIG. 2 is a block diagram of one embodiment of an encryption/decryption system 200. In one embodiment to be illustrated and described, the system 200 includes a user input device 205, a processor 210, one-time pad storage 215, a pad input device 220, an output device 225, temporary storage 230 and long-term storage 235 configured to store, among other things, an embedded pointer 240. An internal bus 245 couples the user input device 205, the processor 210, the one-time pad storage 215, the pad input device 220, the output device 225, the temporary storage 230 and the long-term storage 235 together. A pad bus 250 may directly couple the processor 210 and the pad storage 215.

The user input device 205 is configured to allow a user to enter control and access data. In various embodiments, the user input device 205 is one or more of a keyboard, mouse, trackball, touch screen, optical scanner, microphone or camera.

The processor 210 is configured to provide data processing functionality, e.g., to receive data, perform searches and comparisons, use pseudorandom number techniques to generate references to one-time pads, encrypt, decrypt and communicate and display data. In the illustrated embodiment, the processor 210 also performs standard management functions pertaining to the system 200. Some embodiments employ a standard, commercially available microprocessor. Other embodiments employ a processor that has been optimized to increase its high speed searching and comparison functionality.

The one-time pad storage 215 is configured to store a user-selected one-time pad. In the illustrated embodiment, the one-time pad storage 215 includes a substantial amount (e.g., three GB, perhaps more or less) electrically programmable (e.g., "flash") memory.

In one embodiment, the one-time pad storage 215 is provided with an internal security mechanism (not shown). The internal security mechanism is configured to inhibit unauthorized access to the one-time pad storage 215 by destroying its contents (including the one-time pad) if forced access is attempted. One mechanism for internal memory destruction includes high voltage surge caused by the sudden release of current from an internal capacitor causing the internal conductors to the memory to be destroyed in a manner similar to that of "blowing a fuse." In alternative embodiments, the memory is destroyed through the application of caustic chemicals, perhaps released from a vial integral with the circuit package upon detection of an authorized access, or by the application of extreme heat from an internal battery-powered heat source. Other alternative embodiments bring about memory destruction through rapid rewrite/overwrite of the stored pad information with other data. In one alternative embodiment, the one-time pad storage 215 may also include a location for the storage of the pointer for use in the next access to the one-time pad (i.e., the embedded pointer 240).

The illustrated embodiment of the one-time pad storage 215 is capable of operating in three modes. In a loading mode, the one-time pad storage 215 receives the user-selected pad and related reference information (e.g., chapter, section, page, line, column, paragraph numbering) which is typically received from the one-time pad input device 220 via the internal bus 245 and under the control of the processor 210. In a security confirmation mode, the one-time pad storage 215 uses the stored pointer (e.g., the embedded pointer 240), which may or may not be encrypted, to identify the security characters of interest and provides the security characters (which may or may not be encrypted) to the processor 210 for comparison with the user's security input. In a data destruction mode, the stored one-time pad information is destroyed as a result of the detection of an attempted unauthorized access.

The output device 225 is configured to provide a mechanism for communication with the user. In various embodiments, the output device includes a standard computer display device, cathode ray tube (CRT), liquid crystal display (LCD), light-emitting diode (LED) array, projector or other visual display device. In alternative embodiments, the output device 225 communicates audibly, e.g., through a computer speaker, or through a paper printer device.

The temporary storage 230, which may include random-access memory (RAM), is used in conjunction with the processor 210 to store interim data from the one-time pad storage 215 along with user data for comparison. Because various of the embodiments described herein make use of intermediate calculations and creation of an encoded encrypted data, the temporary storage 230 may be employed to store interim data, including a clear text message, the key and the enciphered encoded message.

The long-term storage 235 is configured to store a file (e.g., a graphic or sound file) that includes one or more embedded pointers to one or more corresponding locations within the pad storage 215 for the start of one or more keys. It will be recalled that, in the embodiments that use a key as an encryption key for the encryption of files, a pointer is maintained along with a cross-reference to the encrypted file. In the embodiments that use the key only as a password, the pointer would only need to be stored temporarily, that is from its generation in a user session to its use as a password for the next user session, during which the pointer would be likely replaced with a pointer to be used as a password during the next user session.

The embedded pointer 240 is configured to point to the start of the key within the one-time pad stored in the pad storage 215. The start of the key may be a modified version of the pointer where the modification is made by application of one or more of a user-selected offset and formula. In one embodiment, the pointer is converted from a decimal form to a binary form, then superimposed bit-by-bit on a predominantly non-textual file, where its existence will be obscured.

The internal bus 245 is configured to provide communication, presently electrical communication, between the various components of the system 200. In the illustrated embodiment, the internal bus 245 is a standard data, address and control bus. In alternative embodiments, the internal bus is be a combination of one or more of electrical, wireless, optical or other methods of communication.

The pad input device 220 is configured to allow the user to provide the user-selected pad. In the illustrated embodiment, the pad input device 220 includes a conventional digital scanner capable of optically scanning pages of text and of converting the resulting data into a digital form for storage in a memory device while maintaining the chapter, page, line, and word spacing formatting and/or identification. In alternative embodiments, the pad input device 220 is a device for inputting previously digitized textual information acquired on-line by way of a download of a selected common document, or from other digital data sources, such as compact discs (CDs), digital versatile discs (DVDs) or the like.

A pad bus 250 may be included to provide direct processor to pad storage device bus communication to expedite and facilitate the use of the key, identified from the one-time pad, to be used as a password. Of course, the internal bus 245 may be used for such purpose instead or additionally. In the illustrated embodiment, the pad bus 250 is an electrical bus, although in other alternative embodiments, the internal bus may be a combination of one or more of electrical, wireless, optical or other methods of communication.

Those skilled in the art to which this application relates will appreciate that other and further additions, deletions, substitutions and modifications may be made to the described embodiments.

What is claimed is:

1. A computer storage apparatus, comprising:
primary file storage configured to store at least one data file;
a controller coupled to said primary file storage and configured to provide an interface by which data is communicated with said primary file storage;
formula/offset file storage coupled to said controller and configured to store at least one formula/offset; and
pointer file storage coupled to said controller and configured to store at least one pointer, said controller further configured to receive a password, employ an encryption pad, a pointer from said pointer file storage and a least one of a formula and an offset from said formula/offset file storage to verify said password and, if said password is valid, grant read or write access to said at least one data file stored in said primary file storage, wherein said encryption pad is a common document and said pointer includes either a page number and line number of said common document or a chapter number and a paragraph number of said common document.

2. The apparatus as recited in claim 1 wherein said formula/offset file storage and said pointer file storage are separate from said primary file storage.

3. The apparatus as recited in claim 1 wherein said primary file storage includes one of:
a hard disk drive,
static random access memory (SRAM), and
a flash drive.

4. The apparatus as recited in claim 1 wherein said controller is configured to generate a key from said encription pad employing at least two of said pointer, said formula and said offset and employ said key to encrypt or decrypt a corresponding file.

5. The apparatus as recited in claim 1 wherein said apparatus is at least partially embodied in an integrated circuit (IC).

6. The apparatus as recited in claim 1 wherein said pointer further includes a word number of said line when including a page number and line number of said common document.

7. The apparatus as recited in claim 1 wherein said pointer further includes a character number of said paragraph when including a chapter number and a paragraph number of said common document.

8. The apparatus as recited in claim 1 wherein said at least one data file is unencrypted.

9. A computer storage apparatus, comprising:
nonvolatile primary file storage selected from the group consisting of:
at least one hard disk drive, and
a flash drive,
and configured to contain stored data including a common document serving as an encryption pad;
a controller coupled to said primary file storage and configured to provide an interface by which external data is communicated with said primary file storage and security for said stored data;
formula/offset file storage coupled to said controller and configured to store at least one formula/offset; and
pointer file storage coupled to said controller and configured to store at least one pointer, said controller further configured to receive a password, employ said encryption pad, a pointer from said pointer file storage and at least one of a formula and an offset from said formula/offset file storage to verify said password and, if said password is valid, grant read or write access to at least one data file stored in said primary file storage, wherein said formula/offset file storage and said pointer file storage are separate from each other and said primary file storage, wherein said at least one pointer is embedded in non-textual data that differs from said stored data, and said controller is configured to generate a key from said common document employing at least two of said pointer from said pointer file storage, said formula and said offset from said formula/offset file storage, and employ said key to encrypt or decrypt a corresponding file, wherein said pointer includes either a page number and line number of said common document or a chapter number and a paragraph number of said common document.

10. The apparatus as recited in claim 9 wherein said corresponding file is said stored data.

11. The apparatus as recited in claim 9 wherein said apparatus is at least partially embodied in an integrated circuit (IC).

12. The apparatus as recited in claim 9 wherein said stored data is unencrypted.

* * * * *